(No Model.)
N. PIGEON.
EVAPORATING LIQUIDS.
No. 290,105. Patented Dec. 11, 1883.
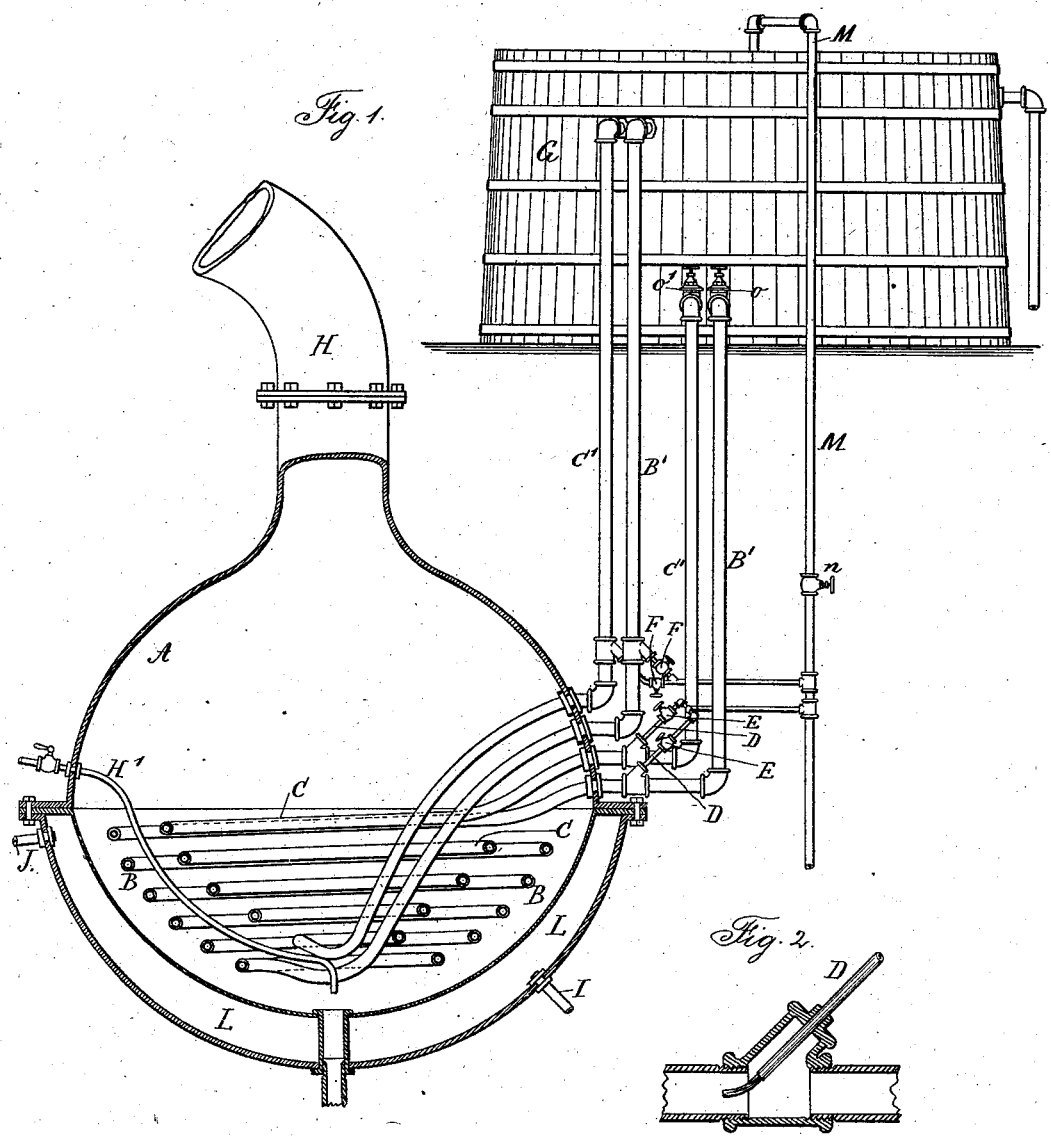
Witnesses:
Harold Serrell
J. Staib
Inventor
Narcisse Pigeon
per Lemuel W. Serrell atty

UNITED STATES PATENT OFFICE.

NARCISSE PIGEON, OF YONKERS, NEW YORK.

EVAPORATING LIQUIDS.

SPECIFICATION forming part of Letters Patent No. 290,105, dated December 11, 1883.

Application filed September 26, 1883. (No model.)

*To all whom it may concern:*

Be it known that I, NARCISSE PIGEON, of Yonkers, in the county of Westchester and State of New York, have invented an Improvement in Evaporating Liquids, of which the following is a specification.

In the concentration of sirups and other liquids it is customary to employ a vacuum-pan containing one or more steam-coils, and with a part of its lower half enveloped in a steam-jacket.

It is found in practice that sirups are liable to become discolored, and in some instances incrusted upon the coils, in consequence of the high temperature of the steam employed.

The object of this invention is to avoid these defects, and to establish an advance in the economical concentration of the liquids treated; and I accomplish these results by using a circulation of hot water in the coils and jacket in lieu of steam, by which means I maintain a nearly uniform temperature, sufficiently high for the ends desired, but not high enough to cause injury, and by which means I also gain in economy, through the repeated use of the same heating medium.

This invention is intended especially for the final concentration of sugar-sirups, but may be applied in the boiling of other liquids, such as milk, glue, &c.

In the drawings, Figure 1 is an elevation partly in section of my concentrating apparatus, and Fig. 2 is a section of the circulator.

The evaporating-pan A is of any desired size or shape. At the upper part is the pipe H, leading to the condenser and air-pump, as usual. The bottom of this vacuum-pan is customarily of copper. Outside of the same is the jacket L, which jacket, in my improvement, is extended higher than usual, so as to give a greater enveloping capacity, as shown in the drawings. Inside the pan are the heating-coils B and C. In a pan of nine feet diameter the pipes forming these coils should be about three inches diameter. The coils are connected with the hot-water tank G by the pipes B' and C', through which the hot water circulates, These pipes are preferably of the same diameter as those forming the coils. A steam-pipe, M, entering the tank G and opening into the water, heats the same, maintaining its temperature at about 200° Fahrenheit. The cock or valve at n regulates the steam-supply, and the gate-valves o o' regulate the quantity of water flowing from the tanks through the pipes B B' and C C'.

In order to produce a rapid flow of water through the coils B C in the evaporating-pan, I use a circulator for each pipe, the same consisting of a steam-jet pipe, D, of about a half-inch diameter, passing into the pipe and terminating in a nozzle that opens in the direction of the flow of the water. The valves E E F F regulate the quantity of steam and the consequent speed of circulation set up. By this action of steam-jets on the water in the pipe greater speed of circulation is effected, and more heat is furnished to the coils. The heated water may be made to circulate by the action of an ordinary pump, either alone or in connection with the steam-jets at the entrance of the hot water into the coils, so as to impart additional heat to such water. The water may be caused to circulate through the jacket, flowing from the tank through the pipe I, and returning through the pipe J, the circulation being enforced by the use of a circulator; but usually the exhaust-steam from the vacuum-pump or elsewhere will be passed by the pipe I directly into the water in the jacket, thus furnishing it with the desired heat. At H' is a small pipe, through which atmospheric air may be admitted into the liquid that is under concentration, in order to cause ebullition and prevent the sirup remaining quiescent whenever such a tendency is perceived. The accumulation of water by the condensation of steam in the tank and jacket is allowed to escape by proper overflow-pipes.

It will now be understood that the circulating water, being heated under atmospheric pressure only, will not exceed the temperature of boiling water, but will usually be somewhat lower; that the rapidity of circulation is not dependent on the water being cooler in one part of the pipes than in another, and that hence such circulation will be sufficiently rapid to cause all parts of the coils to be of nearly uniform temperatuure.

In the concentrating-pans heretofore used the steam is generally of seventy pounds pressure, or thereabout, and of a temperature of about 300° Fahrenheit; hence the liability to carbonize and discolor the material, especially the portion that is in contact with the portion of the coil where the steam enters such coil.

I claim as my invention—

1. The combination, with the vacuum-pan or other article to be heated and the coils in the same containing hot water, of means, such as a steam-jet or a pump, for promoting the rapid circulation of the hot water, substantially as specified.

2. The combination, with the vacuum-pan and its coils, of a hot-water tank connected with the coils by pipes, and of one or more steam-pipes entering said pipes and furnishing a jet or jets of steam into the circulation of the hot water, substantially as set forth.

3. The combination, with the vacuum-pan and its coils and the tank or reservoir for hot water, and connecting-pipes and steam-jet pipes, of a water-jacket to contain hot water, substantially as set forth.

4. The combination, with the coil of pipe containing hot water, of a jet-tube for steam to enter in the direction in which the water is to circulate to promote the rapidity of circulation, substantially as specified.

Signed by me this 22d day of September, A. D. 1883.

NARCISSE PIGEON.

Witnesses:
GEO. T. PINCKNEY,
HAROLD SERRELL.